UNITED STATES PATENT OFFICE 2,582,252

2-ALKOXYPHENETHYL-6-CARBOXYCYCLO-HEXENE-1-ONE-3 ESTERS AND PROCESS FOR PREPARING SAME

John A. Hogg, Kalamazoo, Mich., assignor to The Upjohn Company, Kalamazoo, Mich., a corporation of Michigan No Drawing. Application September 15, 1947, Serial No. 774,171

10 Claims. (Cl. 260—473)

This invention relates to estrogenic compounds, intermediate compounds useful in their preparation, and to a method for the synthesis of the said compounds.

An object of the present invention is to provide a method for the synthetic preparation of estrone, said estrone being identical with that obtained from natural sources. Another object of the invention is the provision of a method for the preparation of pure diastereo and optical isomers of estrone. A further object of the invention is to prepare intermediates which are useful in the synthesis of estrone. An additional object of the present invention is the preparation of estrogenic substances containing a reduced phenanthrene ring. Also an object of the invention is the provision of intermediates which are useful in the synthesis of estrogenic substances. A still further object of the invention is the provision of a method for the separation of diastereoisomers of estrogenic compounds. Still an additional object is the provision of a procedure for the introduction of asymmetric centers into estrogenic compounds or intermediates in pairs, leading to pure compounds having a definite spatial configuration which are separable with a minimum of resolutions. Other objects of the invention will become apparent hereinafter.

The method of the present invention involves the stepwise synthesis starting from an appropriately 1,5,6-substituted-carboxycyclohexene-1-one-3, of the formula:

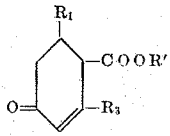

wherein $R_1$ is selected from hydrogen and alkyl. $R'$ is an alcohol residue, preferably hydrocarbon in nature. $R'$ carries this value wherever used herein. The group —COOR′, however, is preferably a carbalkoxy group. $R_3$ is a hydrocarbon radical.

The ester, e. g., 1-methyl-6-carbalkoxycyclohexene-1-one-3, is prepared by condensation of formaldehyde with an acetoacetic ester, followed by cyclodehydration and subsequent selective decarbethoxylation using sodium ethoxide. The esterifying group of the acetoacetic ester appears as $R'$ on the carboxyl in such case, and this compound, wherein $R_1$ is hydrogen, $R_3$ is methyl, and $R'$ is ethyl, is known as Hagemann's ester, (Berichte 26, 876 (1893)). The use of an aldehyde other than formaldehyde introduces an additional substituent $R_1$, which is located at carbon 5 of the ring. The structure of the aldehyde determines the group $R_1$, and this is restricted only by the nature of available aldehydes (Horning, Denekas, and Field, J. Org. Chem. 9, 547 (1944)). $R_1$, when other than hydrogen, is preferably an alkyl group of seven carbon atoms or less, and may be, for example, methyl, ethyl, propyl, isopropyl, and the like.

Variation of $R_3$ may be accomplished according to the procedure of Mannich and Fourneau (Berichte 71, 2090 (1939)). This involves reaction of a ketone of the formula II 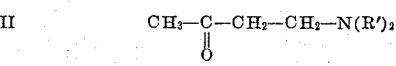

with a beta-keto ester of the formula:

III 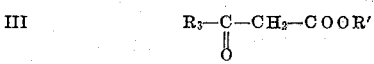

wherein $R'$ may be a hydrocarbon radical. $R_3$ in the keto-ester III has the values indicated for $R_3$ in compound I, and thus, for example, when $R_3$ is $R'OCH_2$— (Organic Reactions, I, 10), $R_3$ in compound I becomes $R'OCH_2$—.

The Hagemann-type ester (I) bearing the desired substituents is reacted with a meta-substituted phenethyl halide of the formula:

IV 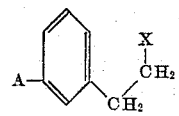

wherein A is a group convertible to hydroxyl with the aid of hydrolysis, preferably an ether group, and X is a halogen atom, preferably bromine, in the presence of a suitable condensing agent, such as an alkali metal amide or alcoholate. While, for the purposes of the present invention, the A group is in the meta position on the benzene ring, this A group may also be located in the para position. These agents may be, for example, sodamide, sodium hydride, sodium, or potassium, with the latter especially suitable. As medium for the condensation, benzene, xylene, an alcohol such as ethanol or tertiary butanol, and like organic solvents are advantageously employed, with tertiary butanol being preferred. The reactants may be heated together at a temperature between about 80 degrees and about 150 degrees centigrade, usually at the reflux temperature of the particular solvent employed, for a period of about 6 to 15 hours. Twelve hours is usually sufficient to allow optimum yields of product. Reaction time will, however, vary with the particular temperature employed and exact nature of the reactants, and shorter or longer periods are sometimes entirely satisfactory. Equimolar proportions of reactants are usually employed. Other proportions are satisfactory, though not ordinarily productive of particular advantage. The resulting compounds, having the formla:

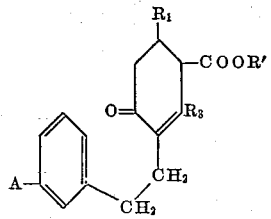

wherein A, $R_1$, $R_3$, and $R'$ have the values previously assigned, are a product of the condensation of the beta-phenethyl halide with the 2-position of the cyclohexenone ester, and may be washed with dilute acid, dried, separated from solvent, and purified by distillation or in other suitable manner. Compound V may also exist as the free A-hydroxyl derivative.

Illustrative examples will be given from time to time to illustrate the practice of the present invention, and are in no way to be construed as limiting. Those immediately following are illustrative of the preparation of compound V from compounds IV and I.

EXAMPLE 1

*Preparation of 1 - methyl - 2-(m-methoxyphenethyl) -6-carboethoxycyclohexene-1-one-3*

Thirteen grams (0.563 mole) of sodium was added portionwise to 250 milliliters of liquid ammonia containing 0.2 gram of hydrated ferric nitrate, with cooling only when necessary to facilitate the speed of addition. The mixture was stirred until the blue color was replaced by gray, whereafter the resulting suspension was cooled in an alcohol-dry ice bath, and 102.5 grams (0.563 mole) of Hagemann's ester, 1-methyl-6-carbethoxycyclohexene-1-one-3, was added as rapidly as possible with the continued application of the cooling bath. The deep-red reaction mixture was stirred without cooling for twenty minutes, and was then cooled again while 300 milliliters of dry toluene and 50 milliliters of sodium dried ether were added. The cooling bath was then removed and the mixture stirred two hours at room temperature until substantially all of the ammonia had escaped. The reaction vessel was then heated to boiling, at which point the sodio-derivative appeared as a yellow precipitate.

One hundred and twenty grams (0.563 mole) of m-methoxyphenethyl bromide was added and the suspension refluxed under a nitrogen atmosphere for 18 hours. The resulting mixture was washed with dilute hydrochloric acid and then with water. The toluene layer was dried over magnesium sulfate, and the toluene was removed under vacuum. After a small forerun, distillation of the residue yielded 102 grams (58 per cent) of the desired product boiling at 180–184 degrees centigrade at 0.3 millimeter of mercury pressure.

Analysis:
  Calc. for $C_{19}H_{24}O_4$: C, 72.2; H, 7.58.
  Found: C, 71.6; H, 7.41.

EXAMPLE 2

*Preparation of 1,5-dimethyl-2-(m-methoxyphenethyl) -6-carbethoxycyclohexene-1-one-3*

Five and eight-tenths grams (0.148 mole) of potassium was dissolved in 125 milliliters of anhydrous tertiary butanol and 29.0 grams (0.148 mole) of 1,5-dimethyl-6-carbethoxycyclohexene-1-one-3 was added thereto. After ten minutes, 31.8 grams (0.148 mole) of m-methoxyphenethyl bromide was added and the mixture refluxed under an atmosphere of nitrogen for 12 hours, at the end of which time the solution was neutral. The butanol was then removed under reduced pressure and the residue treated with water and ether. The ether layer was washed with water, dried, and the ether distilled. Final distillation yielded 27.7 grams (56.7 per cent) of the desired 1,5 - dimethyl-2-(m-methoxyphenethyl) -6-carbethoxycyclohexene-1-one-3, boiling at 178–195 degrees centigrade at 0.3 millimeter of mercury pressure absolute.

EXAMPLE 3

*Preparation of 1 - methyl - 2-(m-methoxyphenethyl) - 5 - isopropyl-6-carbethoxycyclohexene-1-one-3*

In the same manner as given for Example 2, 7.3 grams (0.17 mole) of potassium, 136 milliliters of tertiary butanol, 38.2 grams (0.17 mole) of 1 - methyl-5-isopropyl-6-carbethoxycyclohexene-1-one-3, and 36.6 grams (0.17 mole) of m-methoxy phenethyl bromide were refluxed together for a period of about 12 hours and the desired product, 1 - methyl - 2 - (m-methoxyphenethyl) - 5 - isopropyl-6-carbethoxycyclohexene-1-one-3, boiling at about 188–210 degrees centigrade at 0.3 millimeter of mercury pressure absolute, isolated from the reaction product. The yield of desired compound was 50 per cent of the theoretical.

Various modifications may be made in the method of the present invention, and it is to be understood that I limit myself only as defined in the appended claims.

I claim:

1. The process which includes: reacting at a temperature between about 80 degrees and about 150 degrees centigrade, a phenethyl halide of the formula:

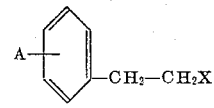

wherein A is an alkoxy group and wherein X is a halogen atom, with a cyclohexenone of the formula:

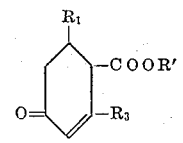

wherein $R_1$ is selected from the group consisting of hydrogen and lower-alkyl, wherein $R'$ is an alcohol radical, and wherein $R_3$ is alkyl in the presence of an alkali condensing agent selected from the group consisting of alkali metals, alkali metal amides, and alkali metal alkoxides, to produce a compound of the formula:

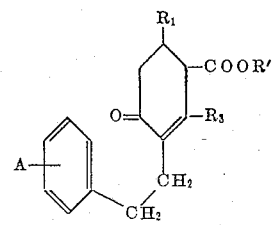

wherein the letters A, $R_1$, $R_3$ and $R'$ have the values given for the starting reactants.

2. The process of claim 1, wherein the phenethyl halide is a meta-ether-substituted phenethyl halide.

3. The process of claim 1, wherein the phenethyl halide is a meta-methoxyphenethyl halide.

4. The process of claim 1, wherein the phenethyl halide is a meta-ether-substituted phenethyl bromide.

5. The process of claim 1, wherein the reaction is conducted in an organic solvent and the temperature is maintained between about 80 degrees and about 150 degrees centigrade.

6. A compound of the formula:

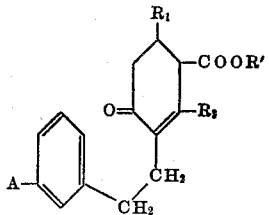

wherein A is alkoxy, $R_1$ is selected from the group consisting of hydrogen and lower-alkyl, R' is an alkyl radical, and $R_3$ is alkyl.

7. 1 - methyl - 2 - (m-methoxyphenethyl) - 6 - carbethoxycyclohexene-1-one-3.

8. 1,5 - dimethyl - 2-(m-methoxyphenethyl)-6-carbethoxycyclohexene-1-one-3.

9. 1 - methyl - 2 - (m - methoxyphenethyl) -5-isopropyl-6-carbethoxycyclohexene-1-one-3.

10. The process of claim 1, wherein the radical R' is an alkyl radical.

JOHN A. HOGG.

REFERENCES CITED

The following references are of record in the file of this patent:

UNITED STATES PATENTS

| Number | Name | Date |
|---|---|---|
| 2,429,166 | Miescher et al. | Oct. 14, 1947 |

FOREIGN PATENTS

| Number | Country | Date |
|---|---|---|
| 719,572 | Germany | Apr. 14, 1942 |

OTHER REFERENCES

Bardhan et al., J. Chem. Soc., 1932, Pt. 2, pp. 2520–2526.

Fieser, "Chemistry of Natural Products Related to Phenanthrene," Reinhold Pub. Co., New York, N. Y., 1936, pp. 76–77.

Haworth et al., J. Chem. Soc., 1939, p. 1300.

Doisy, J. Endocrinology, vol. 30, pp. 936–938 (1942).

Bachmann et al., J. Am. Chem. Soc., vol. 64, pp. 974–981 (1942).

Breitner, Chem. Abstracts, vol. 38, cols. 4953–4954 (1944).